Jan. 5, 1932.   M. B. SMITH   1,839,507
MECHANISM FOR REVERSING AND REMOVING PHONOGRAPH RECORDS
Filed Jan. 21, 1929   8 Sheets-Sheet 4
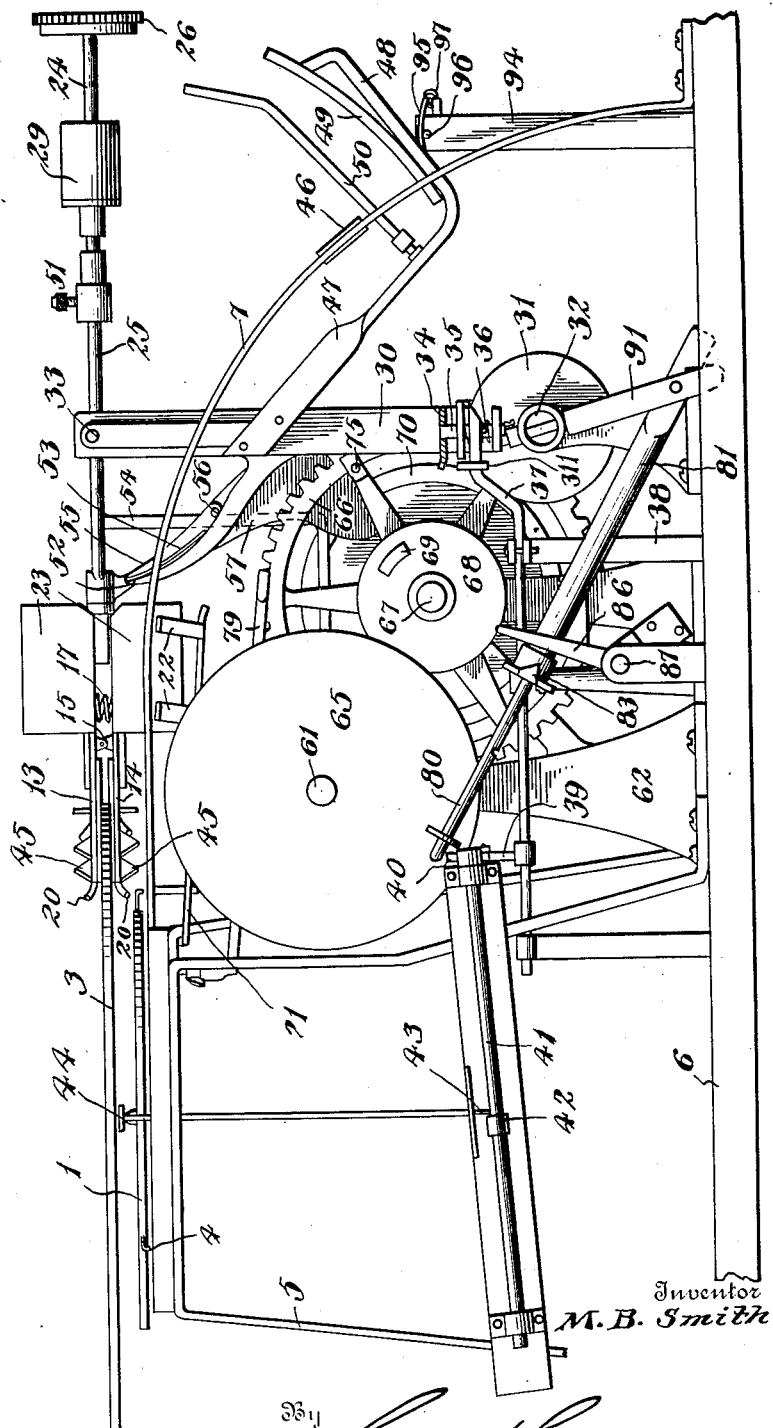
Inventor
M. B. Smith
By Lacey & Lacey, Attorneys Jan. 5, 1932.    M. B. SMITH    1,839,507
MECHANISM FOR REVERSING AND REMOVING PHONOGRAPH RECORDS
Filed Jan. 21, 1929    8 Sheets-Sheet 5
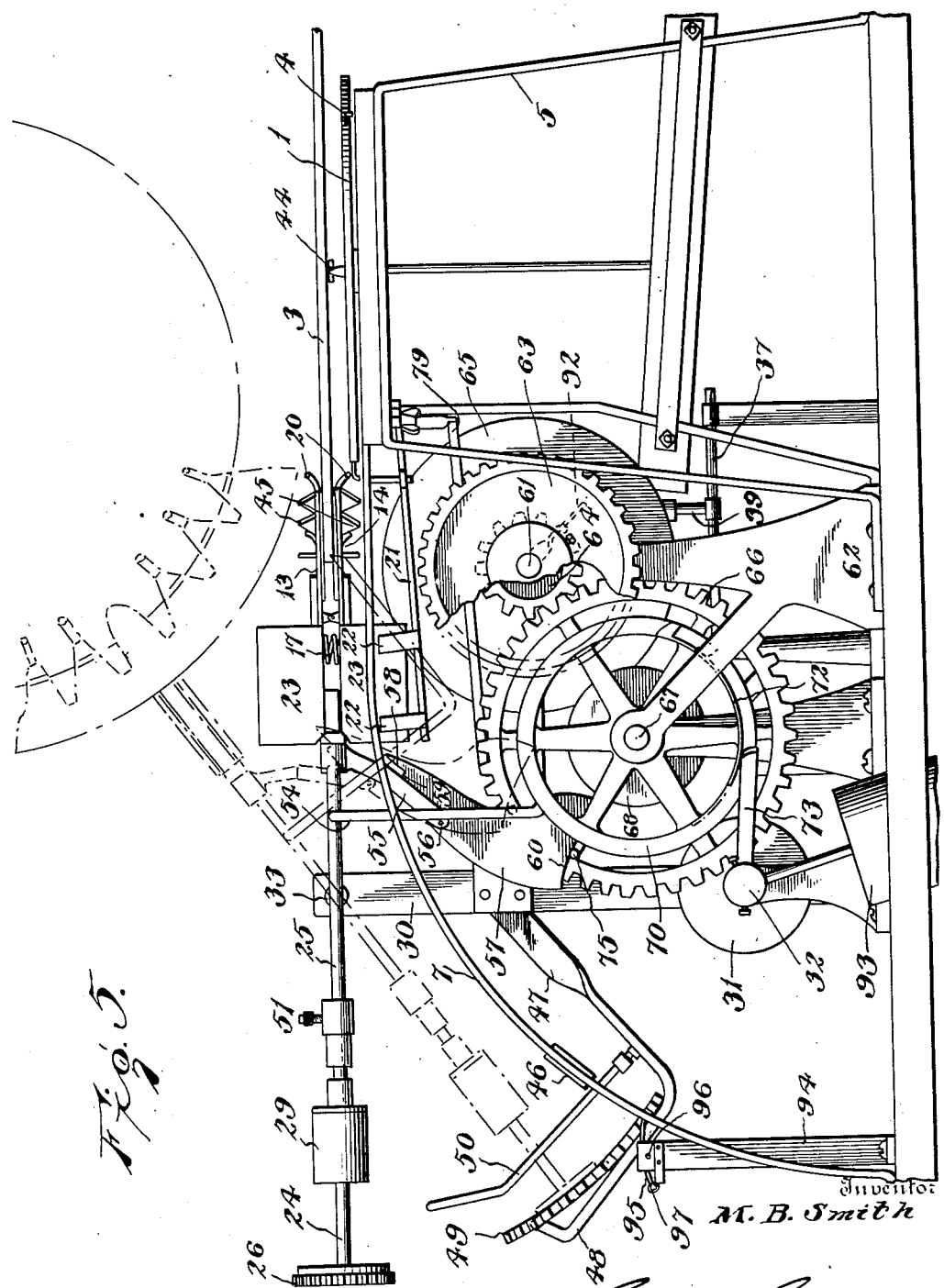

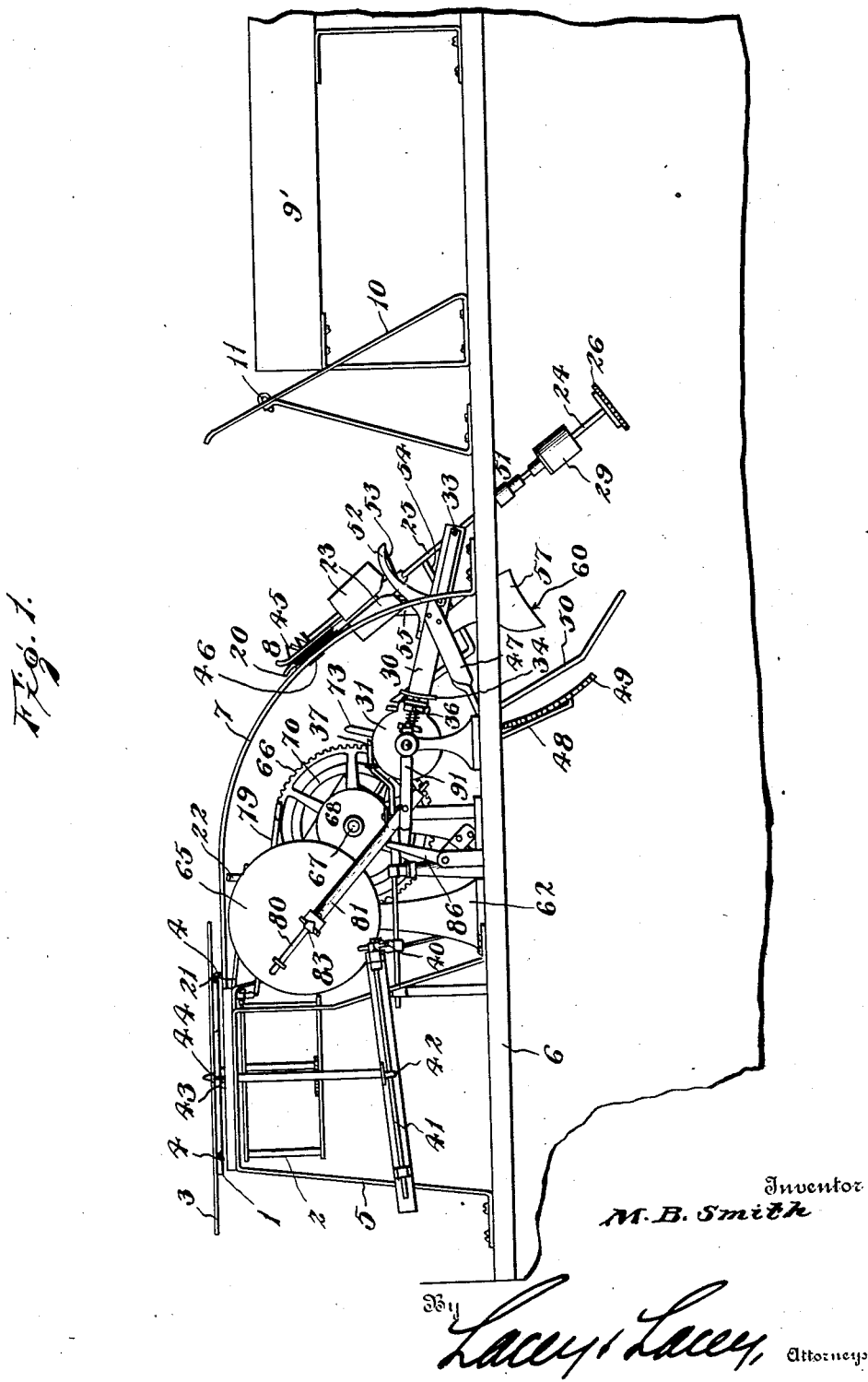

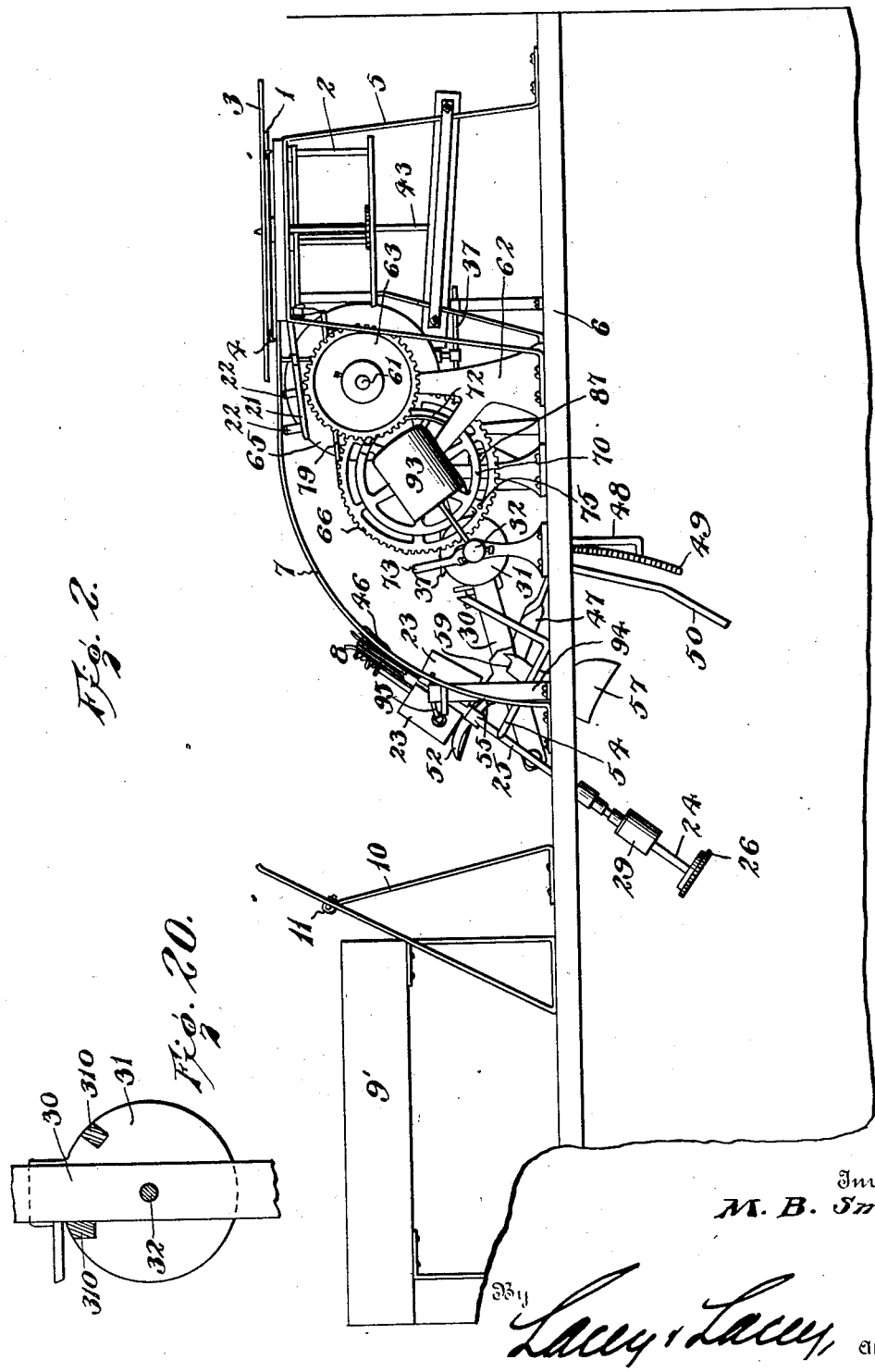

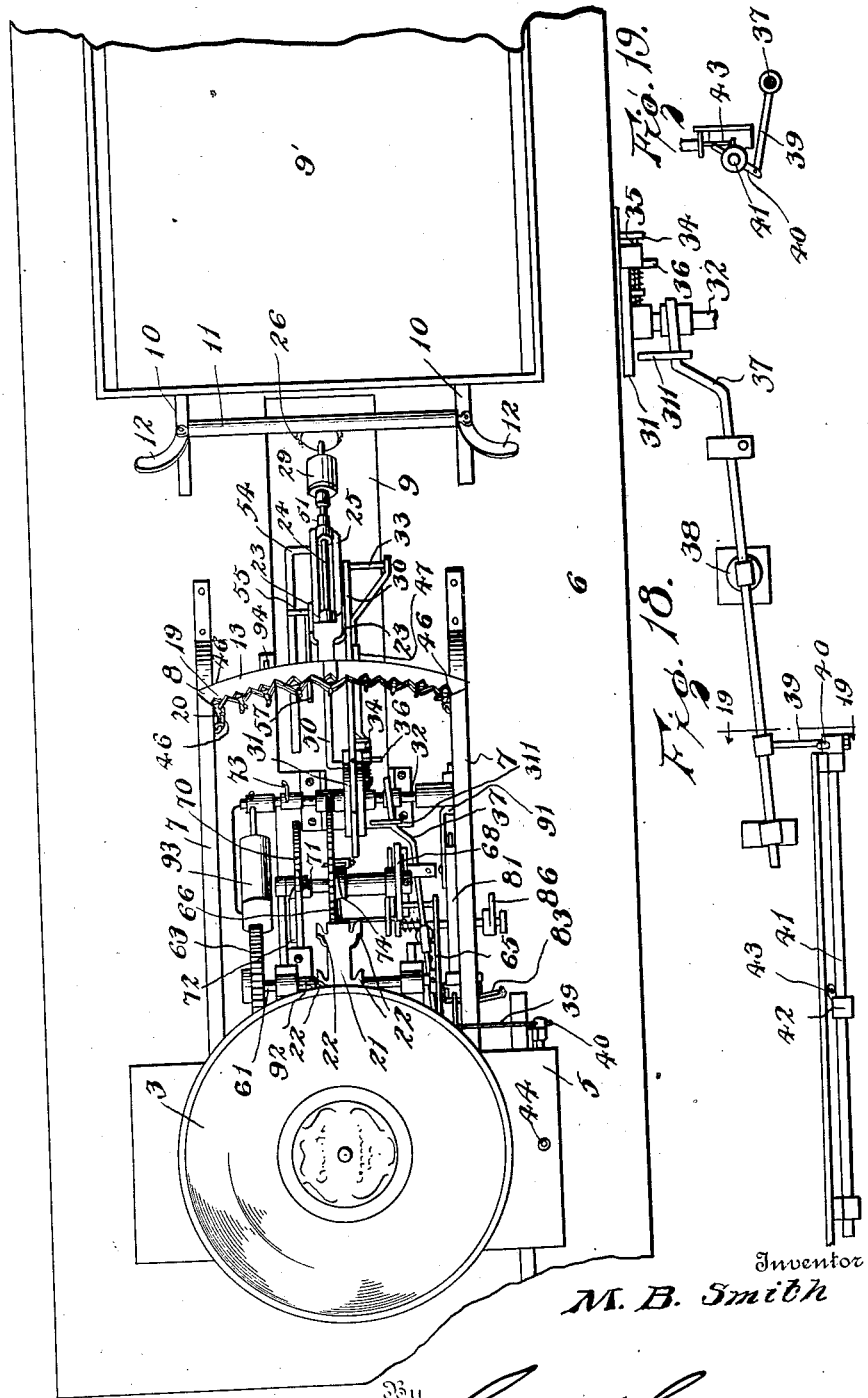

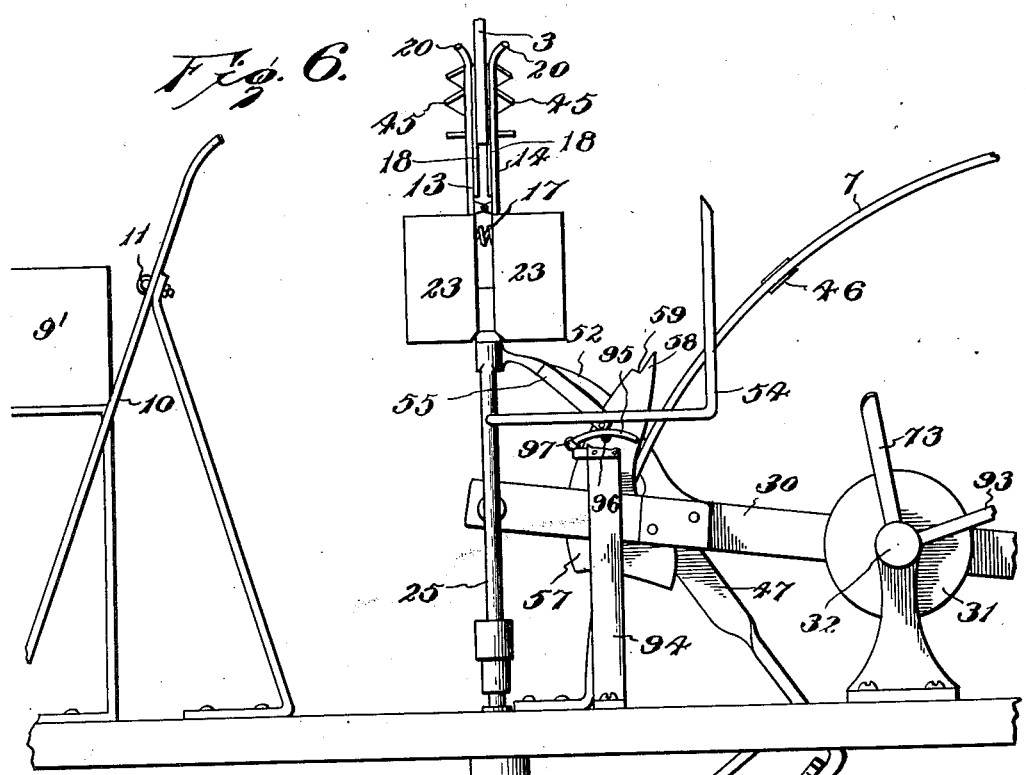

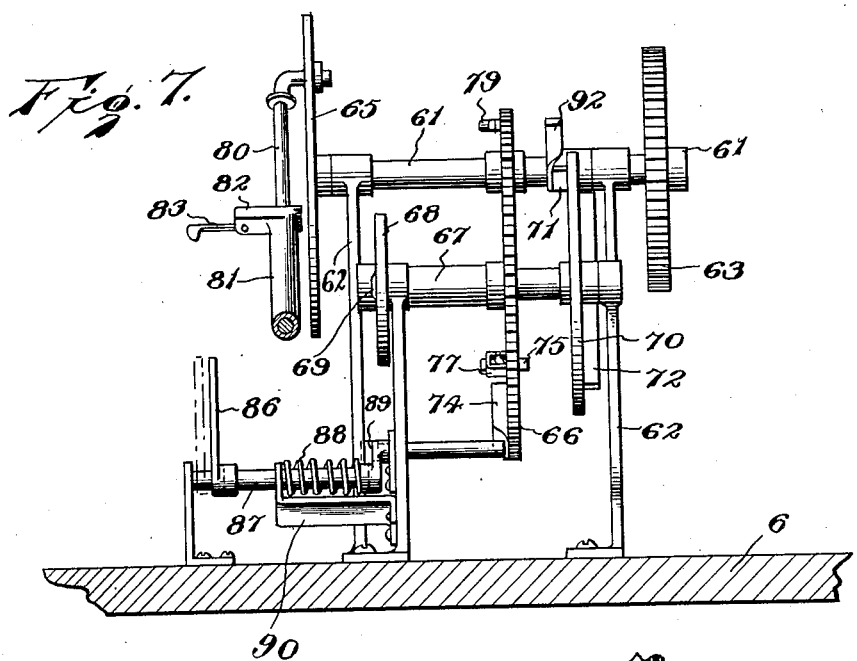
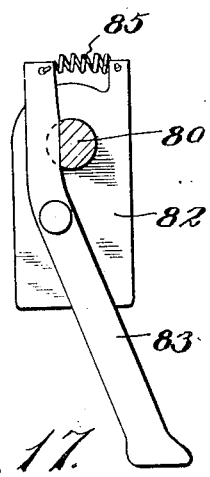
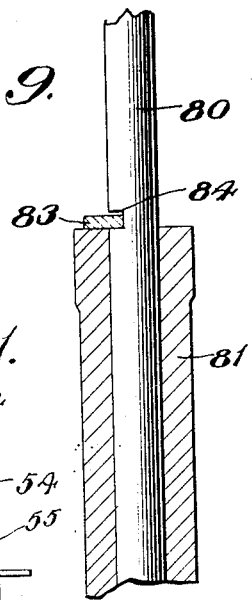
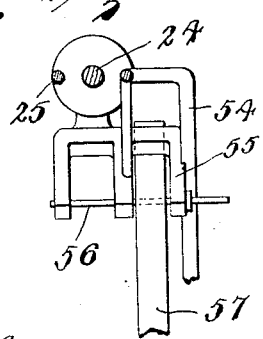
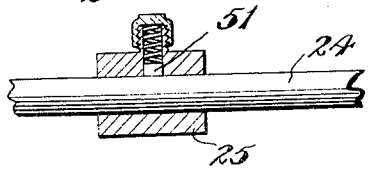

Jan. 5, 1932. M. B. SMITH 1,839,507
MECHANISM FOR REVERSING AND REMOVING PHONOGRAPH RECORDS
Filed Jan. 21, 1929 8 Sheets-Sheet 8
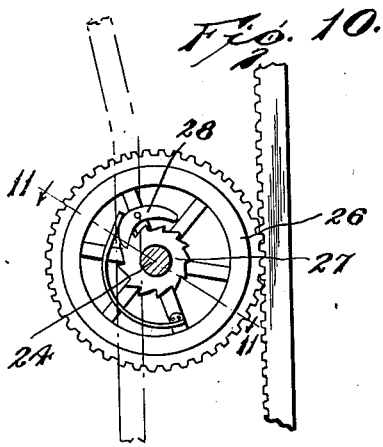
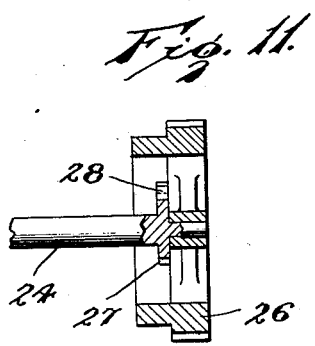
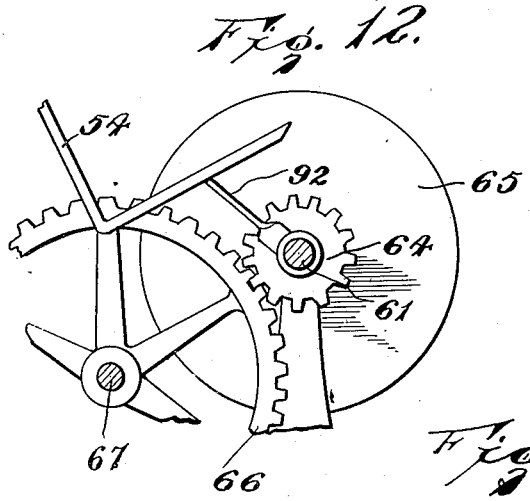
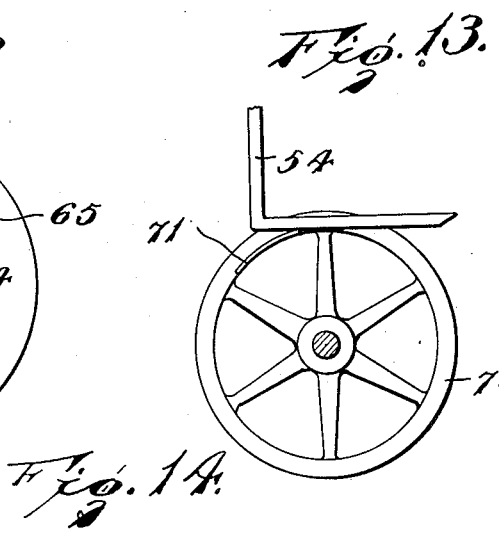
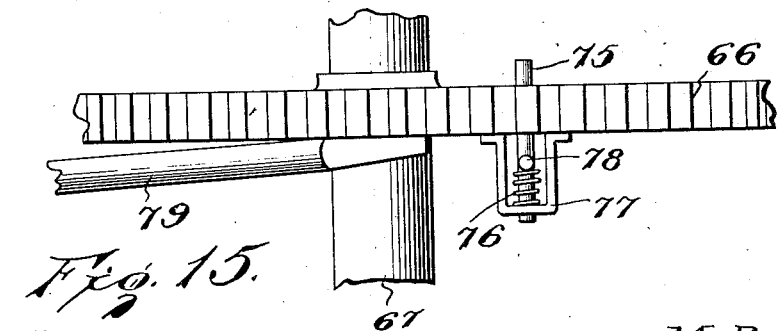
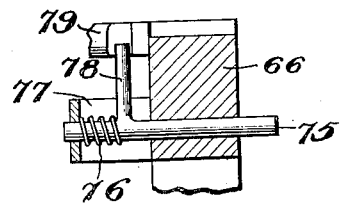
Inventor
M. B. Smith
By Lacey Lacey, Attorneys Patented Jan. 5, 1932

1,839,507

UNITED STATES PATENT OFFICE

MERTON B. SMITH, OF BOISE, IDAHO

MECHANISM FOR REVERSING AND REMOVING PHONOGRAPH RECORDS

Application filed January 21, 1929. Serial No. 334,045.

This invention has for its object the provision of means for mechanically reversing a phonograph record after the composition upon one side thereof has been played and then after the second composition has been played to remove the record and transfer it to a storage compartment. The invention provides means whereby record-gripping fingers will be caused to operate through a prescribed cycle to perform the stated functions and which will be driven by a suitable motor without any attention upon the part of the operator other than to start and stop the motor. The invention also includes means for adjusting the device to the diameter of the record which is in service. A machine embodying the invention is illustrated in the accompanying drawings and will be hereinafter described, the novel features being particularly defined in the appended claims.

In the drawings:

Figure 1 is a side elevation of an apparatus embodying the invention,

Fig. 2 is a similar view showing the opposite side of the machine,

Fig. 3 is a plan view thereof,

Fig. 4 is an enlarged side elevation showing the gripping fingers holding a record which has been lifted from the turntable of a phonograph, Fig. 5 is a similar view showing the opposite side of the machine and illustrating by dotted lines the action of the mechanism in reversing the record, Fig. 6 is a side view of a portion of the mechanism showing the record carrier in an intermediate position as it transfers the record to a storage receptacle, Fig. 7 is an enlarged transverse section, Figs. 8 and 9 are detail views of a latch cooperating with the main crank, Fig. 10 and 11 are detail views of a ratchet mechanism which controls the reversing action, Figs. 12 and 13 are details showing different positions of the elements which prevent dropping of the record, Figs. 14 and 15 are detail views of a latch and releasing device therefor which cooperate with the main gear wheel to control the operation, Fig. 16 is an enlarged section through the gripping fingers, Fig. 17 is a detail of a portion of the gripper-carrying shaft, Fig. 18 is a plan view of the mechanism which adapts the device to a larger record, Fig. 19 is an end elevation of said mechanism, with a part in section, on the line 19—19 of Fig. 18, Fig. 20 is a detail of the main lever and the crank disk for operating it, and Fig. 21 is a detail of the lifter and the bracket or frame engaged thereby.

The reference numeral 1 indicates the usual turntable of a phonograph mechanism, the mechanism for driving this turntable being omitted and the frame supporting the same being illustrated in a conventional manner only at 2, while a record is indicated at 3. The turntable 1 is of the usual construction, except that it is reduced in diameter about one inch in order to permit the gripping fingers which will be hereinafter described to move toward the center of the turntable a sufficient distance to properly engage and hold the record. To compensate for the reduction in the diameter of the turntable and maintain the necessary support for the record, brackets 4 are secured to the periphery of the turntable at intervals and project radially therefrom to support the record. In carrying out the present invention, a frame 5 is mounted upon a bed plate 6 in position to carry the turntable and its supporting frame and from the upper part of said frame rails 7 extend longitudinally of the bed plate and are curved downwardly to meet the same and have their ends secured thereto, the record gripper 8 and the parts for carrying and operating the same being disposed upon the bed plate between the vertical planes of the said rails, as will be understood upon reference to Fig. 3. The bed plate 6 is to be secured within the phonograph cabinet in any preferred manner at an intermediate point in the height of the same and it is constructed with a longitudinal slot, indicated at 9, to accommodate parts of the mechanism. In spaced relation to the rails 7, a box or casing 9' having an open top is secured upon the bed plate, and adjacent the inner side of this receptacle or box brackets 10 are erected upon the bed plate to extend upwardly and inwardly and carry a roller 11 which serves as a stop or bumper for the record carrier in the operation of the device. The upper extremities of the brackets 10 are curved outwardly, as shown at 12, so as to guide the record carrier properly against the roller 11.

The record carrier or gripper comprises two arcuate plates 13 and 14 provided on their inner opposite sides with mating lugs 15 through which a pivot 16 is fitted, the working edges of the plates being normally pressed toward each other by an expansion spring 17 disposed between the plates at the rear or below the pivot lugs, and the inner faces of the plates are preferably equipped with cushions 18 of leather or rubber or other material which will obtain a firm grip upon a record without scratching or marring the surface of the same. As shown in Fig. 3, the plates 13 and 14 have teeth 19 formed along their concave edges and from the tips of these teeth divergent fingers 20 extend in position to pass above and below a record, the engagement of the fingers with the record serving to spread the plates so that they will clear the edge of the record and effectually grip the opposite sides of the same through the action of the spring 17. A bracket 21 extends from the frame 5 below the turntable and between the tracks 7, and this bracket is provided on its side edges with upstanding guide lugs 22, as shown. The gripping plates 13 and 14 are provided on their outer sides with longitudinally extending plates 23 which, as the gripper approaches a record, will pass between the guide lugs 22 and will thereby center the gripper relative to the record so that an effectual engagement of the gripper with the record will be accomplished. As shown most clearly in Fig. 16, the gripper plate 14 is formed integral with the upper or forward end of a shaft 24 which is journaled in a frame 25 and extends through and beyond the lower end of said frame and has a pinion 26 loosely mounted upon its rear end. A ratchet 27 is fixed upon the shaft and a pawl 28, carried by the pinion 26, engages the ratchet so that upon movement of the pinion in one direction the shaft 24 will be rotated and upon movement of the pinion in the opposite direction the pawl will ride over the ratchet without imparting movement to the same and to the shaft. The shaft, adjacent its lower end, carries a counterweight 29 to balance the weight of a record carried by the gripper and serve as a flywheel to maintain a steady motion in the shaft 24 when a record is being reversed.

Pivoted to one side of the frame 25 is a lever 30 which extends to and is fitted through a pulley or disk 31 secured upon a shaft 32 journaled in suitable bearings provided therefor on the bed plate 6, the shaft extending transversely relative to the bed plate. This lever 30 has the pin 33, which connects it to the frame 25, extended laterally somewhat, as shown in Fig. 3, whereby it is adapted to serve as a stop to limit the downward movement of the lever by impinging against the bed plate. The pulley 31 consists of a pair of spaced disks, as shown in Fig. 3, and the lever extends between the disks and has a limited relative pivotal movement between lugs 310 on the inner faces thereof but is normally fixed thereto so that it will rotate therewith. To lock the lever to the pulley, a lug 34 is provided on the side of the lever, and this lug has a hole therethrough which is normally engaged by a spring-propelled latch 35 mounted on the side of the pulley, and the normal adjustment of these parts sets the lever and the grippers for cooperating with a ten inch record. When a twelve inch record is in service, the latch 35 is withdrawn from the lug 34 by engagement of a stud 36 on the latch with the end of a trip rod 37 fulcrumed upon a post 38 adjacent the shaft 32, the said rod being equipped near its rear end with an arm 39 connected with a crank 40 on the front end of a rock shaft 41 which is mounted in suitable bearings on the side of the frame below the turntable and is equipped between its ends with a crank 42, against which the lower end of a push rod 43 bears. This push rod 43 extends up through the support for the turntable at the side of the turntable and is equipped at its upper end with a head or button 44. When a ten inch record is being played, the push rod 43 is spaced from the periphery of the record but when a twelve inch record is placed in playing position, the margin of the record will bear upon the push rod to depress the same and thereby rock the shaft 41 so that the forward end of the trip rod 37 will be swung into the path of the stud 36, and as the lever 30 is swung upwardly the latch 35 will be withdrawn from the lug 34 so that the lever may have some slight lost motion relative to the pulley 31 and, therefore, the gripper will cease its travel sooner than when it engages a ten inch record. Otherwise, however, the action of the mechanism is precisely the same whether a ten inch or a twelve inch record is in service. The relative pivotal movement of the lever will be limited by its engagement with the previously inactive stop lug 310, and to make the movement certain, a strike arm 311 near the front end of the trip rod projects laterally into the path of the lever to receive impact thereof.

The teeth 19 of the gripper plates present beveled or relatively inclined surfaces which engage the brackets 4 if one of them should happen to be in the path of the teeth and a slight movement will be thereby imparted to the turntable so that the bracket will be pushed out of the way of the advancing gripper and will not interfere with the proper engagement of the record by the gripper. The gripper is also provided on both its outer surfaces with beveled or pointed lugs 45 which are adapted to engage a bracket 4 in like manner as the teeth 18 engage the same in the event that the turntable should happen to move while the record is being reversed.

Guide rollers 46 are provided on the rails 7 to be engaged by the lugs 45 as the gripper returns to the rails after having been swung away from the same so that when the gripper is at rest it will be properly centralized upon the track.

Secured to the lever 30 is an arm 47 having an angularly disposed terminal 48 which, when the parts are at rest, extends through the slot 9 in the bed plate, and this terminal 48 carries a rack 49 which is engaged by the pinion 26 when a record is to be reversed. Extending from the opposite side of the arm 47 is an angular arm 50 which extends laterally from the arm 47 and then longitudinally substantially parallel with the rack so as to pass at the opposite side of the shaft 24 and guide the pinion into proper engagement with the rack 49, and it may be noted that the frame 25 carries a friction presser block 51 which bears upon the shaft 24 with a desired tension to prevent overthrow of the shaft. Extending from the lever 30 in substantial alinement with the arm 47 is a bracket 52 having a leaf spring 53 extending across its concave edge, as shown. Secured to the frame 25 at the side thereof opposite the lever 30 is an angular checking arm 54 which, in the position seen in Fig. 2, extends downwardly or rearwardly from the frame and then upwardly, and a bracket 55 extends from the frame 25 at the junction of the plates 23 therewith, said bracket having an extended pivot pin 56 fitted through its lower end and suspending a lifter 57. The lifter 57 is shown most clearly in Fig. 5 and it will be noted that its upper end is formed with a tooth 58 and a shoulder 59 while its lower end is concave, as shown at 60, and is adapted to be engaged by a stud on a driving gear, as will presently appear.

The driving shaft 61 is mounted in suitable bearings provided therefor at the upper ends of standards or posts, such as 62, secured upon the bed plate and is located adjacent the frame 5, as shown most clearly in Fig. 2. This shaft 61 is equipped with a gear 63 which may be driven from any convenient motor, such as a small electric motor, having worm gearing operatively connected with said gear so that the desired slow movement will be imparted to the gear, the motor being started or stopped by manipulation of a proper starting and stopping switch of any convenient type. The motor and its connections are not shown in the accompanying drawings inasmuch as, in themselves, they form no part of the invention and illustration thereof is not necessary to an understanding of the same. At the inner side of the main gear 63, a pinion 64 is secured upon the shaft 61, and at the end of the shaft opposite the gear 63 a crank disk 65 is secured to the shaft. The pinion 64 meshes with a large gear 66 upon a countershaft 67, and upon the counter-shaft 67 there is a cam disk 68 having a projection 69 thereon, the sole function of which is to engage a projection on the trip rod 37 and shift said rod out of the path of the latch 35 so that the device will be automatically reset to act upon a ten inch record when a twelve inch record has been removed. It may be noted, at this point, that after the trip rod has been thus shifted, impact of the pin 33 upon the bed plate will return the lever 30 to its initial relation to the crank disk and permit the latch 36 to become active. There is also secured upon the counter-shaft 67 a disk 70 which is provided on one face with a lug 71 adapted at times to engage the arm 54 and support the same, and provided upon its opposite side with a track 72 which at times engages a resilient crank 73 on the rock shaft 32 and thereby holds the rock shaft against motion. The gear 66 carries a cam projection 74 and is also equipped with a transversely disposed lifter pin 75 normally held in projected position to operate at the side of the gear opposite the cam projection 74 by a spring 76 bearing against the outer end of the guide bracket 77 which supports the pin and against a stud 78 on the pin. A releasing bar 79 is carried by the main frame 5 below the guide bracket 21 and projects forwardly with its free tapered end immediately adjacent the side of the gear 66 so that the stud 78 will ride against the same in the operation of the device and the lifter pin will be thereby withdrawn. This pin 75 is adapted at times to engage the lower concave end of the lifter 57 and thereby cause said lifter to engage in the upper end of the bracket 55 and ride upwardly with the gear 66 so that the frame 25 and the gripper with the record engaged thereby will be swung about the pivot 33, as indicated by the dotted lines in Fig. 5. When the frame 25 is thus swung pivotally, the pinion 26 is caused to mesh with the rack 49 so that the shaft 24 is rotated through one-half a revolution and the record is reversed.

To the disk 65 is pivoted a crank comprising a plunger 80 and a cylindrical housing 81 in which the plunger has sliding movement. At the upper end of the housing 81 is a lateral extension or bracket 82 upon which is pivoted a latch arm 83 adapted to engage a notch 84 in the plunger and thereby hold the plunger against sliding movement, the latch being held in this engaged position by a retractile spring 85, as will be understood upon reference to Fig. 8. The free end of the latch projects laterally into the path of a trip 86 secured on the outer end of a rod 87 which is slidably mounted in suitable brackets on the bed plate 6 and has its inner end disposed in the path of the cam projection 74 on the gear 66. See Fig. 7. A spring 88 bears against an offset 89 on the rod 87 and against a bracket 90 provided therefor so that the pin is normally held in the path of the projection 74 and at the proper point in the operation of the device will be pushed by the projection into position to engage the latch 83. The engagement of the latch with the trip releases the latch from the plunger so that the plunger may then slide within the housing 81, and as soon as the latch has cleared the trip the pin 87 will clear the projection 74 and will thereupon be restored to its initial position by the action of the spring 88. The housing 81 is pivoted in a forked crank 91 on the rock shaft 32 and, when the plunger is locked to the housing by the action of the latch 83, the motion of the disk 65 will be transmitted to the crank 91 so that the shaft 32 will be rocked and the lever 30 swung upwardly to carry the gripper into engagement with the record. The action is so timed that the latch is released just as the gripper engages the record and the disk 65 then turns through one complete revolution without actuating the rock shaft, during which revolution the record is lifted from the turntable, reversed and then replaced upon the turntable. As the disk 65 completes this revolution, the latch 83 will again engage the plunger 80 so that during the next half revolution the gripper is returned to its lower position away from the turntable. During the revolution of the disk 65 which permits reversing of the record, the track 72 on the disk 70 is disposed over the resilient crank arm 73 on the shaft 32 so that the shaft is positively held thereby against movement and as the latch 83 reengages the plunger 80 the stop or brake crank 73 clears the track 72 so that the shaft is then free to rock.

A checking arm 92 is secured upon the shaft 61 at one side of the pinion 64 and is adapted at times to engage the arm 54, as shown in Fig. 12, and the rock shaft 32 is equipped with a counter-weight 93 which aids in holding it at rest without strain upon the other braking parts when it is not to operate and also to impart steadiness to its movement when it is to operate.

At one side of the slot 9 in the bed plate, there is erected a post 94, at the upper end of which there is pivotally mounted a deflector 95 consisting of an arcuate plate normally resting upon a pin 96 on the post and yieldably held thereto by a spring 97. When the gripper swings upwardly in its initial movement, the extended pin 56 rides against the under side of the deflector 95 which yields to the impact so that the course of travel of the gripper is not affected but upon return movement of the gripper the pin 56 impinges against the upper side of the deflector and travels rearwardly over the same so that the gripper will be caused to swing about the pivot 33 and impinge against the roller 11, the impact serving to separate the gripper jaws 13 and 14 so that if a record be then held by said jaws it will be released and will drop into the case 9'.

Assuming that the parts are in the position shown in Figs. 1 and 2 and that one side of a record has been played, the attendant will start the motor geared to the gear 63 and will remove the tone arm from over the record in the usual manner. The rotation of the shaft 61 will be imparted directly to the disk 65 and through the described gearing to the shaft 67 and the gear 66. The first half revolution of the disk 65 will rock the shaft 32 through one-fourth of a turn to the position shown in Fig. 4, the latch 83 being brought into engagement with the trip 86, as has been described, so that the plunger will be released from the housing 81. The disk 65 may then continue to rotate without imparting any additional movement to the shaft 32. The motion which has been imparted to the shaft 32, however, has served to bring the grippers into engagement with the record as shown in Fig. 4 and by full lines in Fig. 5, and the gear 66 has continuously rotated so that the trip 86 has been restored to its normal position and the pin 75 has been brought into engagement with the lower end of the lifter 57, as shown in Fig. 5. The continued movement of the gear 66 will then impart upward movement to the lifter and through it and the bracket 55 to the frame 25 so that said frame and the gripper will be moved approximately to the position shown by dotted lines in Fig. 5. The pinion 26 is thus brought into engagement with the rack 49 and the shaft 24 is rotated through one-half a revolution. Just as the shaft completes its half revolution, the pin 75 is released from the lifter 57 by the action of the trip rod 79 and the weight of the grippers and the record engaged by them overcomes the counter-weight 29 so that the record returns by gravity to a position over the turntable. During this descending movement, the check arm 92 has been brought into position below the bracket 54, as shown in Fig. 12, so that the downward movement will be temporarily arrested and the record will not be permitted to drop heavily onto the turntable. As the check arm 92 clears the bracket 54, the record will be set gently on the table. As the record resumes its position on the turntable, the crank disk 65 completes a revolution but as the trip 86 is now out of the path of the end of the latch, the plunger will be relocked to the housing 81 and the continued movement of the disk will rock the shaft 32 so as to return the grippers to the initial position. It will thus be seen that when the crank disk 65 has made two complete revolutions the grippers have been engaged with a record, have reversed the record and then withdrawn therefrom after replacing it upon the turntable. The second composition upon the record is now played in the usual manner and the motor connected with the gear 63 is then again started. During the ensuing revolution of the shaft 61 and the crank disk 65, the rock shaft 32 will be continuously rocked to the position shown in Fig. 4 and then returned to the initial position shown in Fig. 1 inasmuch as during this rotation of the crank disk 65 the cam projection 74 of the gear 66 will not act upon the pin 87 and the trip 86. The pin 75 upon the gear 66 will also be inactive during this rotation of the crank disk 65 inasmuch as the gear 66 makes only one complete revolution to three revolutions of the crank disk. The lifter 57 will, consequently, be inactive during the third revolution of the crank disk 65 and the grippers will be, therefore, simply moved to the record to grip the same and then lifted slightly to clear the turntable and then withdrawn. The slight lifting movement imparted to the record will be due to the action of the lug 71 on the disk 70 riding under the arm or bracket 54 and imparting a sufficient upward movement to the same and the frame 25 to release the record from the turntable. Upon the return movement of the grippers and the frame 25, the pin 56 will ride over the deflector 95, as has been described, and the grippers will be thereby swung against the brackets 10, the impact serving to separate the jaws sufficiently to release the record which thereupon falls over the roller 11 into the case 9'.

Having thus described the invention, I claim:

1. In mechanism for the stated purpose, a turntable having a diameter appreciably less than a phonograph record to be supported thereby, extensions on the periphery of the turntable to support the record, grippers movable into engagement with the projecting margin of the record, and beveled teeth on the grippers to engage said extensions and shift the turntable as the grippers approach it.

2. In mechanism for the purpose set forth, the combination of record-engaging means, means for moving said record-engaging means into engagement with a record, means for lifting said record-engaging means to clear the record of its support, and means for checking return movement of the record-engaging means.

3. In mechanism for the stated purpose, record-engaging means comprising opposed jaws pivoted together, yieldable means for moving the working faces of the jaws toward each other, and divergent fingers extending from the free edges of the jaws to pass above and below a record.

4. In mechanism for the stated purpose, record-engaging means comprising a pair of pivotally connected jaws, yieldable means for holding the working faces of the jaws toward each other, divergent fingers extending from the free edges of the jaws, and tapered lugs on the outer faces of the jaws.

5. In mechanism for the stated purpose, record-engaging jaws, a shaft carrying said jaws, a frame supporting said shaft, a pinion on the end of the shaft, means connected with the frame for moving the jaws and the shaft toward and from a record, a rack adapted to be engaged by said pinion, and means for imparting upward movement to the jaws and a record engaged by them whereby to cause travel of the pinion over the rack to rotate the shaft and the jaws to reverse the record.

6. In mechanism for the stated purpose, record-engaging means, a frame carrying said means, means connected with said frame for moving the record-engaging means into engagement with a record, a depending lifter pivoted on said frame and arranged to lockingly interengage therewith, and means to engage under the lower end of said lifter and impart vertical rocking movement thereto and to said frame for withdrawing and returning a record, and means for rotating the record-engaging means to reverse the record as the record is raised and lowered.

7. Mechanism for the stated purpose comprising record-engaging means, a lever connected therewith, means for rocking the lever and moving the record-engaging means into engagement with a record, means for disconnecting the lever-rocking means whereby it will be inoperative during a portion of the cycle of operations, and means for raising, lowering and rotating the record-engaging means to reverse the record during the period of inoperativeness of the lever-rocking means.

8. In mechanism for the stated purpose, the combination of record-engaging means, a rock shaft connected with said record-engaging means, means for rocking the shaft including a continuously rotating crank disk, a housing connected with the rock shaft, a plunger pivoted to the crank disk and slidably fitted in the housing, a latch on the housing normally engaging the plunger, a trip in the path of the latch whereby to release the plunger from the housing after a part rotation of the crank disk whereby the rock shaft will be inoperative during further rotation of the crank disk, means for raising and lowering the record-engaging means during the inactive period of the rock shaft, means for rotating the record-engaging means during said inactive period, and means controlled by the raising and lowering means for setting said trip.

9. In mechanism for the stated purpose, the combination with a turntable, of means movable toward and from the turntable for engaging and removing a record thereon, a push rod disposed vertically adjacent the turntable in position to permit the marginal portion of a record to project over and rest thereon, and means controlled by the push rod to limit the movement of the record-engaging means toward the turntable.

10. In mechanism for the stated purpose, the combination with a turntable, of means movable toward and from the turntable for engaging and removing a record thereon, a rock shaft below the turntable, a push rod operatively connected with and rising from the rock shaft adjacent the turntable whereby the margin of a record on the turntable may rest on and depress the push rod to rock the shaft, and means actuated by the rock shaft to limit the movement of the record-engaging means toward the turntable.

11. In mechanism for the stated purpose, the combination with a turntable, of means for engaging a record thereon, a lever connected with the record-engaging means to swing the same to and from the turntable, an oscillatory disk engaged with said lever to actuate the same, means to lock the lever to the disk in one position whereby to impart a full stroke to the lever for engaging a record having a certain diameter, a rock shaft below the turntable, a push rod rising from the rock shaft adjacent the turntable to be depressed by the marginal portion of a record having a greater diameter, and means controlled by the rock shaft for releasing the lever-locking means whereby to permit lost-motion of the disk and impart a limited movement to the lever and the record-engaging means to engage the record of greater diameter.

12. In mechanism for the stated purpose, the combination of a turntable, record-engaging means, means for swinging the record-engaging means to and from the turntable for engaging and withdrawing a record on the turntable, means for rotating the record-engaging means to reverse the record during one withdrawing movement of said means, and means whereby said rotating means will be inactive during a subsequent withdrawing movement of the record-engaging means.

13. In mechanism for the stated purpose, the combination of a turntable, means for engaging a record thereon, means for swinging the record-engaging means to and from the turntable, and a deflector arranged to yield to the record-engaging means as said means moves toward the turntable and be engaged by said means in the movement from the turntable whereby to rock said means out of its normal path for delivering a record to a receptacle.

In testimony whereof I affix my signature.

MERTON B. SMITH. [L. S.]